May 29, 1951 R. A. MULLANEY 2,554,919

RECORD PLAYING ADAPTER

Filed March 8, 1949

RALPH A. MULLANEY
*INVENTOR.*

BY Bruce G. Birchard

HIS AGENT

Patented May 29, 1951

2,554,919

UNITED STATES PATENT OFFICE 2,554,919

RECORD PLAYING ADAPTER

Ralph A. Mullaney, Elmwood Park, Ill., assignor to Zenith Radio Corporation, a corporation of Illinois Application March 8, 1949, Serial No. 80,127

10 Claims. (Cl. 274—9)

This invention relates to a novel record playing adapter and more particularly to such an adapter to be utilized in conjunction with an existing record player or record changer, and deriving motive power therefrom.

Over a period of many years manufacturers of disc recordings have produced records having information recorded thereon for reproduction at the rotational speed of 78 revolutions per minute (R. P. M.). For playing such records, record players were produced including turntables operative solely at this rotational speed. Through the period of years, during which recorded entertainment enjoyed extended popularity, a very large number of these record playing devices were produced to meet the demands of the public. Thus, a great many of these devices were distributed and are presently in use.

Subsequently, certain manufacturers of disc recordings suggested that the physical size of the discs be reduced and that they be driven at a decreased rotational speed. This was not a new concept inasmuch as the broadcasting industry and others had previously employed transcriptions requiring a rotational speed of 33⅓ R. P. M. Also, a concurrent reduction in the width of the grooves, on which the recorded information is impressed, provided the means for a further decrease in the physical size of the record disc. Two schools of thought arose as to the proper slower rotational speed to be employed. One group submitted 33⅓ R. P. M., the other 45 R. P. M. and production of both varieties of recordings was begun.

Thus it is now apparent that a problem has arisen in the art, namely to make available an adapter unit to those persons who own equipment designed only for the playing of 78 R. P. M. recordings. By using an adapter in conjunction with existing equipment, the advantages of economy in space and in cost of the above described slow-speed recordings are thereby afforded. For convenience and economy, such an adapter unit should be operable with a minimum of alterations to the existing record player. Also, in order that such an adapter unit be commercially feasible, it must be relatively simple to construct and inexpensive to market.

It is an object of this invention, therefore, to provide a novel record playing adapter for a record player or record changer having a turntable rotatable at a first speed, and which adapter provides a turntable operable at a preselected second rotational speed.

It is a further object of this invention to provide a record playing adapter for a record player having a turntable rotatable at a speed of 78 R. P. M. and which turntable provides motive power for an adapter turntable selectively operable at the rotational speed of 33⅓ R. P. M. or 45 R. P. M.

It is a still further object of this invention to provide a record playing adapter which is simple to construct and inexpensive to market.

In accordance with the present invention, a record playing adapter for a turntable of the central spindle type rotatably supported on a mounting member comprises a base member which includes a spindle-receiving portion for receiving the spindle of the turntable to orient the adapter with respect to the turntable. Supporting means are affixed to the base member for engaging the mounting member of the turntable and are spaced from the spindle-receiving portion by a distance exceeding one-half the diameter of the turntable. An adapter turntable is supported by the base member in substantially parallel relation thereto and at a predetermined vertical spacing therefrom for rotation about an axis parallel to but radially displaced from the axis of rotation of the first-mentioned turntable by a distance not exceeding the sum of one-half the diameters of the turntables. A driving gear is rotatably supported by the base member in a plane substantially perpendicular to a diameter of the adapter turntable and is positioned in driving engagement with the adapter turntable between the axis of rotation thereof and the spindle-receiving portion. The driving gear has a diameter which exceeds the spacing of the adapter turntable from the base member and completes a driving connection from the first-mentioned turntable to the adapter turntable.

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Figures 1, 2:
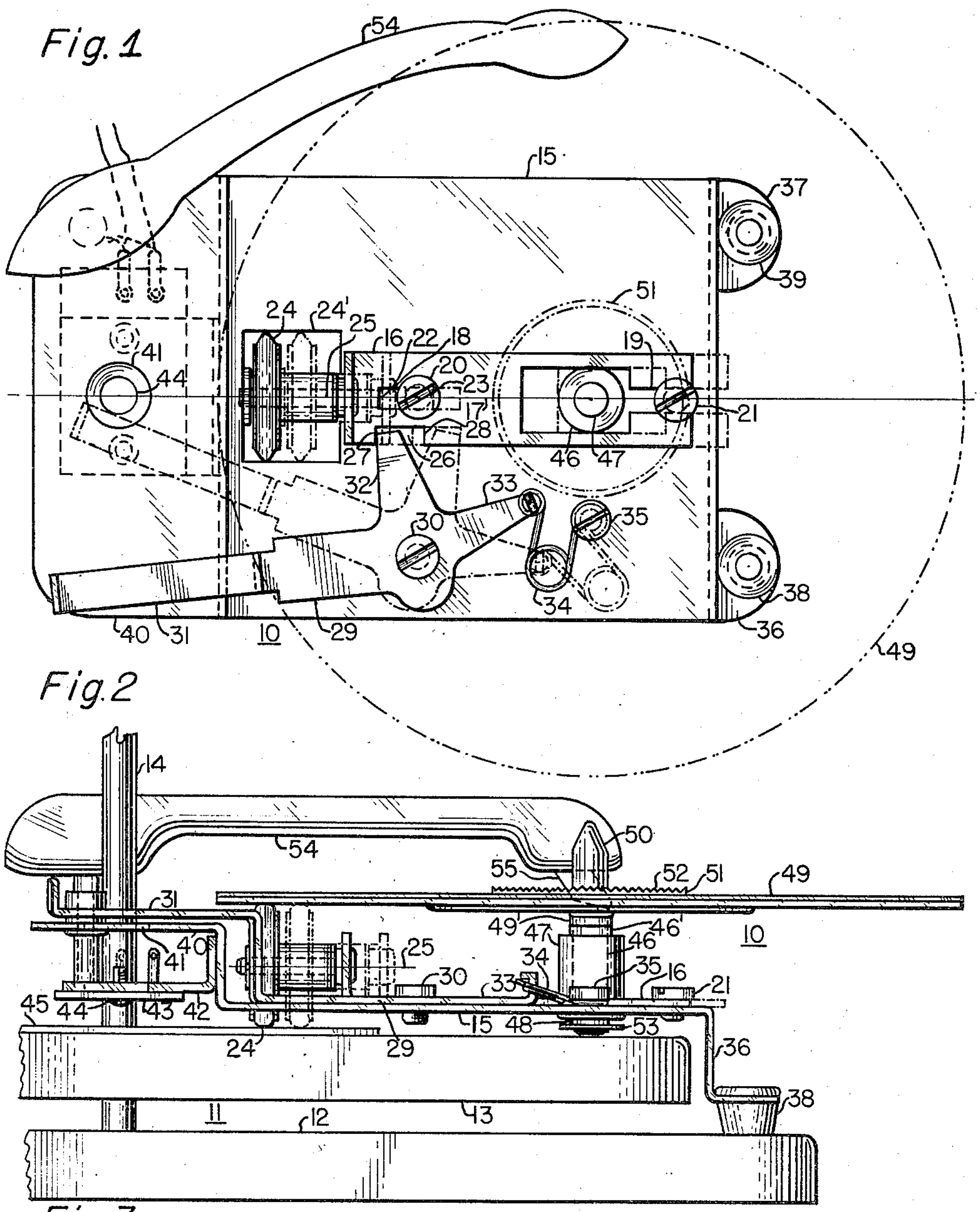
Fig. 1 shows a plan view of a record playing adapter embodying the present invention, the turntable thereof being shown in dash-dot-dot outline.
Fig. 2 shows a side view of the record playing adapter as it is positioned on a conventional record player, portions of the conventional player being shown broken away.

Referring for a moment to Fig. 2, a record playing adapter 10 is positioned on a conventional record player 11, which includes a mount-member 12, a turntable 13 and a spindle 14 projecting vertically through the center of the turntable.

Referring now to Fig. 1, the record playing adapter 10 is shown to include a base member 15 having on its upper surface a carriage 16 supported for rectilinear movement along an axis 17. Rectilinear movement is established by means of slots 18 and 19 provided in carriage 16 which cooperate with screws 20 and 21, respectively, positioned on base member 15. Slot 18 is terminated by carriage portions 22 and 23 each of which, by engaging the body of screw 20, restricts the movement of carriage 16 at a respective one of two limits of travel. Also, included on carriage 16 is a driving gear 24 having a resilient peripheral portion, for example of rubber, supported for rotation about an axis 25, parallel to axis 17. Driving gear 24 extends below the lower surface of base member 15 through an opening 24' therein.

A cut-out portion 26 in carriage 16 provides carriage-actuating shoulders 27 and 28. A control lever 29 is mounted on base member 15 for pivotal movement about a pin 30 and a control handle 31 is extended therefrom. An operating finger 32 extends from control lever 29 and is cooperatively positioned with respect to the carriage-actuating shoulders 27 and 28. An extension 33 of control lever 29 is connected to one end of a toggle spring 34, the other end of which, in turn, is connected to a tie point 35 positioned on base member 15.

A pair of supporting legs 36 and 37 depend from base member 15 and a pair of grommet-cushions 38 and 39 are affixed to respective ends of the legs. This is more clearly shown in Figure 2. Base member 15 includes a shelf 40 positioned above the plane thereof and opposite supporting legs 36 and 37. A clearance opening 41, substantially larger in diameter than spindle 14, is provided in shelf 40. Opening 41 is positioned along the line formed by the intersection of the plane which passes through the axes 17 and 25 and the plane of shelf 40, and at a distance from supporting legs 36 and 37 greater than one-half the diameter of turntable 13.

As indicated in Fig. 2, an L-shaped bracket 42 is secured to the structural partition extending between base plate 15 and its shelf portion 40. An orienting member 43 having an orienting opening 44, is affixed to bracket 42 with its aperture 44 in coaxial alignment with clearance opening 41 in shelf 40. Orienting opening 44 has a diameter substantially equal to that of spindle 14.

A removable disc 45 is shown in Fig. 2 in position on turntable 13. With the record playing adapter 10 in operative position as there represented, spindle 14 passes through orienting opening 44 and clearance opening 41, and the adapter is supported by idler gear 24 bearing on disc 45 and by supporting legs 36 and 37 bearing on mounting member 12 through grommets 38 and 39 respectively. A bearing member 46 is positioned on base member 15 intermediate the orienting aperture 44 and the supports 36 and 37. The member 46 includes a bearing-way 47, the axis of which is parallel to but radially displaced from the axis of turntable 13, when the adapter is in operating position. A turntable shaft 48 is supported for longitudinal and rotatable movement in bearing-way 47 and a turntable 49 is affixed to the upper end thereof. Bearing washers 46' and 49' are rotatably supported on shaft 48, interposed between bearing member 46 and turntable 49. Since shaft 48 is longitudinally movable within bearing-way 47, turntable 49 is frictionally coupled with driving gear 24 solely by virtue of its weight thereon and downward movement of the turntable is restricted by bearing washers 46' and 49'. It should be noted that driving gear 24 lies in a plane substantially perpendicular to a diameter of adapter turntable 49, which plane is also substantially perpendicular to a diameter of turntable 13. A first spindle 50 extends upward from turntable 49, is axially aligned therewith, and has a given diameter. A disc 51, which may be considered as a second spindle, is coaxially supported on turntable 49, and has a larger diameter than spindle 50. Disc 51 has an upwardly extending serrated peripheral portion 52 which is substantially lesser in height than spindle 50. A washer 53, affixed to the lower end of shaft 48, prevents removal thereof from bearing-way 47. Positioned to one side of clearance opening 41, on shelf 40 is a tone arm 54 which includes a transducer element and stylus 55 for engagement with the grooves of a record which is to be played on turntable 49.

Preparatory to operation of the record playing adapter 10 disc 45, which has a centering aperture therein, is placed upon turntable 13 being centered thereon by spindle 14. Disc 45 is employed to afford a smooth driving surface over the usually rough surface of a flocked turntable. However, a specially prepared disc is not necessary, since a conventional record disc may be used for this purpose. It is possible to operate the adapter directly from the flocked surface of the turntable. This latter procedure is not advisable inasmuch as excessive rumble might be produced thereby. The record playing adapter 10 is placed upon the conventional record player 11, with orienting opening 44 and clearance opening 41 individually encircling spindle 14 and is there supported as described above.

Turntable 13 is driven at a rotational speed of 78 R. P. M. by a constant speed, synchronous driving motor (not shown). Disc 45 is in frictional engagement with the surface of turntable 13 and driving gear 24, in turn, is in frictional driving engagement with disc 45. Driving gear 24 is likewise in frictional driving engagement with the under side of turntable 49, and thus a driving connection is established between turntable 13 and turntable 49. It is apparent that the rotational speed of turntable 49 is dependent on the rotational speed of turntable 13 and the position of driving gear 24 with respect to the axes of turntables 13 and 49.

As shown in Figure 1, toggle spring 34 exerts a mechanical bias through arm 33 which tends to rotate control lever 29 in a counterclockwise direction. This tendency is restricted by finger 32 engaging shoulder 27 of carriage 16 and shoulder 23 in turn engaging screw 20. Thus, the carriage 16 is maintained in position as indicated. To cause turntable 49 to rotate at another speed the position of carriage 16 is changed, resulting in a changed position of driving gear 24. This is accomplished by manual manipulation of control handle 31 in such a direction as to rotate control member 29 clockwise about point 30. Operating finger 32 engages shoulder 28, and carriage 16 and idler gear 24 are carried in a direction toward spindle 50. Movement of carriage 16 is arrested by shoulder 22 engaging screw 20. Control lever 29, carriage 16 and idler gear 24 are shifted thus, to the dash-dot positions shown, and toggle spring 34 exerts a mechanical bias which tends to rotate the control lever clockwise about point 30. This tendency is restricted by finger 32 engaging shoulder 28 and shoulder 22 in turn engaging screw 20. With driving gear 24 in the dash-dot position, the speed of rotation of turntable 49 depends upon the speed of rotation of turntable 13 and the new position of driving gear 24 with respect to the axes of turntables 13 and 49. It is apparent, from Fig. 2, that this rotational speed is greater than that speed attained for the afore-described position of driving gear 24. Control lever 29 thus constitutes a speed selector system for selectively positioning carriage 16, which in turn, positions driving gear 24.

By constructing record playing adapter 10 with preselected positions for driving gear 24, it is clear that turntable 16 may be selectively rotatable at the speed of 33⅓ R. P. M. or 45 R. P. M. from turntable 13 which rotates at 78 R. P. M. Of course, by supplying proper positions, any two rotational speeds may be selectively attained. Also, by constructing cut-away portion 26 of carriage 16 in close engagement with finger 32 of control member 29, omitting toggle spring 34, and providing a friction mounting for control member 29 about pin 30, which mounting restrains movement thereof, a variable speed unit, adjustable over a wide range of speeds, may be produced. In addition, a fixed mounting for driving gear 24 yields a single speed adapter.

In utilizing the record playing adapter with existing record playing equipment certain electrical circuit changes must be completed. These changes comprise, disconnecting the transducer element of the existing tone arm (not shown) from the electronic amplifier (not shown) and connecting in place thereof, transducer element 55 of adapter tone arm 54. This may be accomplished by a change-over switch, adapter plugs or in any other well known manner.

Thus, by the use of the invention, existing 78 R. P. M. record-playing equipment is not rendered obsolete with the advent of recordings which require different rotational speeds such as 33⅓ R. P. M. or 45 R. P. M. It may be seen that the record playing adapter is a very simply constructed and inexpensive structure. Moreover, the adapter is easily placed onto an existing record player, with no structural changes of any kind thereon, and motive power for the adapter turntable is derived from the existing turntable.

Figure 3:
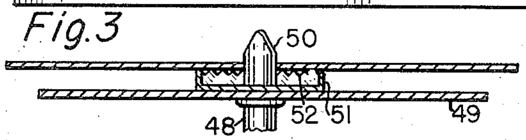
Fig. 3 shows a sectional view of the adapter turntable with one form of record disc in place for playing.
Figure 4:
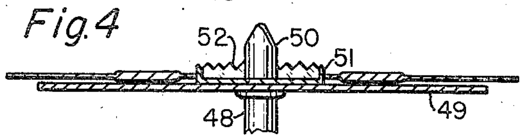
Fig. 4 shows a sectional view of the adapter turntable with another form of record disc in place for playing.

The form of the invention, which has been illustrated, is particularly arranged for the playing of disc recordings having a diameter of approximately 7 inches. As produced, certain of the small discs have a centering aperture similar to that provided in the standard 78 R. P. M. discs, or .181 inch in diameter. Such a disc is centered by spindle 50 and rests on serrated portion 52 of disc-spindle 51 as shown in Fig. 3. Other of the small discs are produced with a much larger centering aperture, having a diameter of 1½ inches. This variety of disc is centered by disc-spindle 51 and rests on the upper surface of turntable 49 as shown in Fig. 4.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A record playing adapter for a turntable of the central spindle type rotatably supported on a mounting member, said adapter comprising: a base member having a spindle-receiving portion for receiving the spindle of said turntable to orient said adapter with respect to said turntable; supporting means affixed to said base member for engaging said mounting member of said turntable and spaced from said spindle-receiving portion by a distance exceeding one-half the diameter of said turntable; an adapter turntable supported by said base member in substantially parallel relation thereto and at a predetermined vertical spacing therefrom for rotation about an axis parallel to but radially displaced from the axis of rotation of said first-mentioned turntable by a distance not exceeding the sum of one-half the diameters of said turntables; and a driving gear rotatably supported by said base member in a plane substantially perpendicular to a diameter of said adapter turntable, positioned in driving engagement with said adapter turntable between the axis of rotation thereof and said spindle-engaging portion, having a resilient peripheral portion and having a diameter exceeding said spacing of said adapter turntable from said base member, in order to complete a driving connection from said first-mentioned turntable to said adapter turntable.

2. A record playing adapter for a turntable of the central spindle type rotatably supported on a mounting member, said adapter comprising: a base member having a spindle-receiving portion for receiving the spindle of said turntable to orient said adapter with respect to said turntable; supporting means affixed to said base member for engaging said mounting member of said turntable and spaced from said spindle-receiving portion by a distance exceeding one-half the diameter of said turntable; an axially movable adapter turntable supported by said base member in substantially parallel relation thereto for rotation about an axis parallel to but radially displaced from the axis of rotation of said first-mentioned turntable by a distance not exceeding the sum of one-half the diameters of said turntables; and a driving gear rotatably supported by said base member in a plane substantially perpendicular to a diameter of said adapter turntable, engaging the under surface of said adapter turntable between the axis of rotation thereof and said spindle engaging portion, and extending below the plane of said base member, in order to complete a driving connection from said first-mentioned turntable to said adapter turntable.

3. A record playing adapter for a turntable of the central spindle type rotatably supported on a mounting member, said adapter comprising: a base member having a spindle-receiving portion for receiving the spindle of said turntable to orient said adapter with respect to said turntable; supporting means affixed to said base member for engaging said mounting member of said turntable and spaced from said spindle-receiving portion by a distance exceeding one-half the diameter of said turntable; an adapter turntable a bearing member supported by said base member and having an axis substantially parallel to but radially displaced from the axis of rotation of said first-mentioned turntable by a distance not exceeding the sum of one-half the diameters of said turntables; a shaft slidably and rotatably supported in said bearing member and affixed to said adapter turntable in coaxial alignment therewith; and a driving gear rotatably supported by said base member in a plane substantially perpendicular to a diameter of said adapter turntable, positioned between the axis of rotation of said adapter turntable and said spindle-engaging portion, engaging the under surface of said adapter turntable, and extending below the plane of said base member, in order to complete a driving connection from said first-mentioned turntable to said adapter turntable.

4. A record playing adapter for a turntable of the central spindle type rotatably supported on a mounting member, said adapter comprising: a base member having a spindle-receiving portion for receiving the spindle of said turntable to orient said adapter with respect to said turntable; supporting means affixed to said base member for engaging said mounting member of said turntable and spaced from said spindle-receiving portion by a distance exceeding one-half the diameter of said turntable; an adapter turntable supported by said base member in substantially parallel relation thereto and at a predetermined vertical spacing therefrom for rotation about an axis parallel to but radially displaced from the axis of rotation of said first-mentioned turntable by a distance not exceeding the sum of one-half the diameters of said turntables and including a pair of coaxially positioned spindles having different diameters; and a driving gear rotatably supported by said base member in a plane substantially perpendicular to a diameter of said adapter turntable, positioned in driving engagement with said adapter turntable between the axis of rotation thereof and said spindle-engaging portion, and having a diameter exceeding said spacing of said adapter turntable from said base member, in order to complete a driving connection from said first-mentioned turntable to said adapter turntable.

5. A record playing adapter for a turntable of the central spindle type rotatably supported on a mounting member, said adapter comprising: a base member having a spindle-receiving portion for receiving the spindle of said turntable to orient said adapter with respect to said turntable; supporting means affixed to said base member for engaging said mounting member of said turntable and spaced from said spindle-receiving portion by a distance exceeding one-half the diameter of said turntable; an adapter turntable supported by said base member in substantially parallel relation thereto and at a predetermined vertical spacing therefrom for rotation about an axis parallel to but radially displaced from the axis of rotation of said first-mentioned turntable by a distance not exceeding the sum of one-half the diameters of said turntables and including a pair of coaxially positioned spindles having different diameters, the spindle of larger diameter having a serrated portion extending circumferentially thereabout and in a direction away from said adapter turntable, and having an axial length smaller than that of the spindle of smaller diameter; and a driving gear rotatably supported by said base member in a plane substantially perpendicular to a diameter of said adapter turntable, positioned in driving engagement with said adapter turntable between the axis of rotation thereof and said spindle-receiving portion, and having a diameter exceeding said spacing of said adapter turntable from said base member, in order to complete a driving connection from said first-mentioned turntable to said adapter turntable.

6. A record playing adapter for a turntable of the central spindle type rotatably supported on a mounting member, said adapter comprising: a base member having a spindle-receiving portion for receiving the spindle of said turntable to orient said adapter with respect to said turntable; supporting means affixed to said base member for engaging said mounting member of said turntable and spaced from said spindle-receiving portion by a distance exceeding one-half the diameter of said turntable; an adapter turntable supported by said base member in substantially parallel relation thereto and at a predetermined vertical spacing therefrom for rotation about an axis parallel to but radially displaced from the axis of rotation of said first-mentioned turntable by a distance not exceeding the sum of one-half the diameters of said turntables; and a driving gear rotatably supported by said base member in a plane substantially perpendicular to a diameter of said adapter turntable, positioned in driving engagement with said adapter turntable between the axis of rotation thereof and said spindle-receiving portion, and having a diameter exceeding said spacing of said adapter turntable from said base member, in order to complete a driving connection from said first-mentioned turntable to said adapter turntable.

7. A record playing adapter for a turntable of the central spindle type rotatably supported on a mounting member, said adapter comprising: a base member having a spindle-receiving portion for receiving the spindle of said turntable to orient said adapter with respect to said turntable; supporting means affixed to said base member for engaging said mounting member of said turntable and spaced from said orienting provisions by a distance exceeding one-half the diameter of said turntable; an adapter turntable supported by said base member in substantially parallel relation thereto and at a predetermined vertical spacing therefrom for rotation about an axis parallel to but radially displaced from the axis of rotation of said first-mentioned turntable by a distance not exceeding the sum of one-half the diameters of said turntables; a displaceable driving gear supported by said base member for rotational and longitudinal movement along an axis substantially parallel to the diameter of said adapter turntable extending in a direction toward said spindle-receiving portion, positioned in driving engagement with said adapter turntable between the axis of rotation thereof and said spindle-receiving portion, and having a diameter exceeding said spacing of said adapter turntable from said base member, in order to complete a driving connection from said first-mentioned turntable to said adapter turntable; and a selector system mounted on said base member to engage and longitudinally displace said idler gear into a selected one of a plurality of positions.

8. A record playing adapter for a turntable of the central spindle type rotatably supported on a mounting member, said adapter comprising:

a base member having a spindle-receiving portion for receiving the spindle of said turntable to orient said adapter with respect to said turntable; supporting means affixed to said base member for engaging said mounting member of said turntable and spaced from said orienting provisions by a distance exceeding one-half the diameter of said turntable; an adapter turntable supported by said base member in substantially parallel relation thereto and at a predetermined vertical spacing therefrom for rotation about an axis parallel to but radially displaced from the axis of rotation of said first-mentioned turntable by a distance not exceeding the sum of one-half the diameters of said turntables; a displaceable driving gear supported by said base member for rotational and longitudinal movement along an axis substantially parallel to the diameter of said adapter turntable extending in a direction toward said spindle-engaging portion, positioned in driving engagement with said adapter turntable between the axis of rotation thereof and said spindle-engaging portion, and having a diameter exceeding said spacing of said adapter turntable from said base member, in order to complete a driving connection from said first-mentioned turntable to said adapter turntable; and a selector system mounted on said base member to engage, longitudinally displace, and lock said idler gear into a selected one of a plurality of positions.

9. A record playing adapter for a turntable of the central spindle type rotatably supported on a mounting member, said adapter comprising: a base member having a spindle-receiving portion for receiving the spindle of said turntable to orient said adapter with respect to said turntable; supporting means affixed to said base member for engaging said mounting member of said turntable and spaced from said spindle-receiving portion by a distance exceeding one-half the diameter of said turntable; an adapter turntable supported by said base member in substantially parallel relation thereto and at a predetermined vertical spacing therefrom for rotation about an axis parallel to but radially displaced from the axis of rotation of said first-mentioned turntable by a distance not exceeding the sum of one-half the diameters of said turntables; a carriage member supported by said base member for longitudinal movement along an axis substantially parallel to the diameter of said adapter turntable extending in a direction toward said spindle-receiving portion; a driving gear supported on said carriage member for rotation about an axis parallel to the direction of movement thereof, positioned in driving engagement with said adapter turntable between the axis of rotation thereof and said spindle-receiving portion, and having a diameter exceeding said spacing of said adapter turntable from said base member, in order to complete a driving connection from said first-mentioned turntable to said adapter turntable; and a selector system mounted on said base member to engage and to displace said carriage member into a selected one of a plurality of positions.

10. A record playing adapter for a turntable of the central spindle type rotatably supported on a mounting member, said adapter comprising: a base member having a spindle-receiving portion for receiving the spindle of said turntable to orient said adapter with respect to said turntable; supporting means affixed to said base member for engaging said mounting member of said turntable and spaced from said spindle-receiving portion by a distance exceeding one-half the diameter of said turntable; an adapter turntable supported by said base member in substantially parallel relation thereto and at a predetermined vertical spacing therefrom for rotation about an axis parallel to but radially displaced from the axis of rotation of said first-mentioned turntable by a distance not exceeding the sum of one-half the diameters of said turntables; a driving gear rotatably supported by said base member in a plane substantially perpendicular to a diameter of said adapter turntable, positioned in driving engagement with said adapter turntable between the axis of rotation thereof and said spindle-receiving portion, and having a diameter exceeding said spacing of said adapter turntable from said base member, in order to complete a driving connection from said first-mentioned turntable to said adapter turntable; and a tone arm positioned on said base member for engaging and tracking the grooves of a record placed upon said adapter turntable.

RALPH A. MULLANEY.

REFERENCES CITED

The following references are of record in the file of this patent:

UNITED STATES PATENTS

| Number | Name | Date |
|---|---|---|
| 2,049,821 | Nystrom | Aug. 4, 1936 |